United States Patent [19]

Schoessow

[11] Patent Number: 4,976,913
[45] Date of Patent: Dec. 11, 1990

[54] NUCLEAR ENERGY SYSTEM USING PELLETIZED FUEL IN A BOILING LIQUID REACTOR

[76] Inventor: Glen J. Schoessow, 300 N.W. 34th Ter., Gainesville, Fla. 32607

[21] Appl. No.: 342,125

[22] Filed: Apr. 24, 1989

[51] Int. Cl.⁵ .............................................. G21C 15/00
[52] U.S. Cl. ................................. 376/381; 376/291; 376/411
[58] Field of Search ........ 376/381, 382, 265, 355–358, 376/411, 282, 289, 292, 291

[56] References Cited

U.S. PATENT DOCUMENTS

| | | | |
|---|---|---|---|
| 2,990,349 | 6/1961 | Roman | 376/265 |
| 3,039,945 | 6/1962 | Slack et al. | 376/355 |
| 3,046,212 | 7/1962 | Anderson | 376/265 |
| 3,202,581 | 8/1965 | Barr et al. | 376/265 |
| 3,620,916 | 11/1971 | Hilborn et al. | 376/381 |
| 4,236,573 | 12/1980 | Dorling et al. | 376/296 |
| 4,678,626 | 7/1987 | Germer | 376/293 |

FOREIGN PATENT DOCUMENTS 151592  8/1985  Japan ................................... 376/282

*Primary Examiner*—Daniel D. Wasil
*Attorney, Agent, or Firm*—Arthur G. Yeager; Earl L. Tyner

[57] ABSTRACT

An energy producing system employing nuclear fission of fuel in pellets disposed in a boiling liquid to produce superheated vapors.

4 Claims, 3 Drawing Sheets

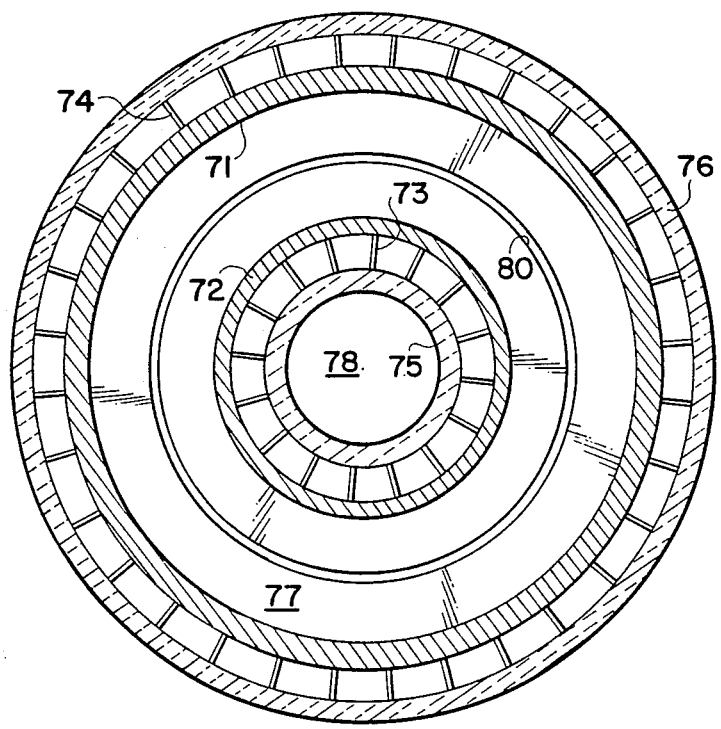
FIG 5
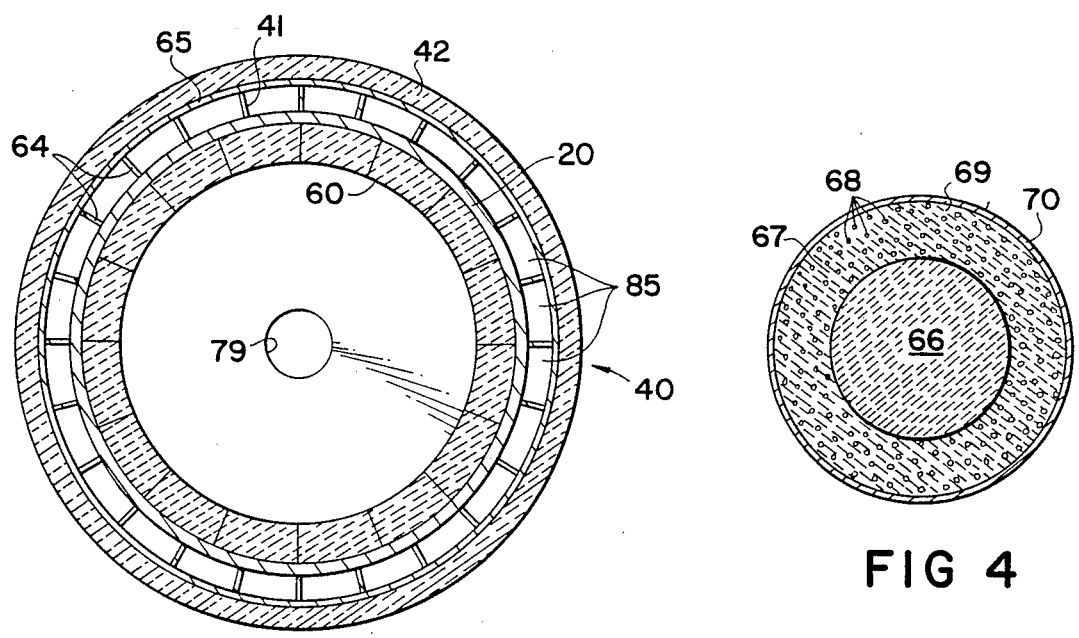
FIG 3
FIG 4

NUCLEAR ENERGY SYSTEM USING PELLETIZED FUEL IN A BOILING LIQUID REACTOR

BACKGROUND OF THE INVENTION

Most of approximately 540 land-based nuclear power reactors in operation throughout the world are pressurized water reactors (PWR) and the remainder for the most part, are boiling water reactors (BWR). The main exception is in the USSR where large graphite moderated water cooled reactors are used. In Canada and a few other places in the world heavy water reactors are used and may be gas cooled as used in England. In 1979 a PWR reactor at Three-Mile Island underwent a reactor core melt down, a financially disastrous event that did not entail any human injuries. This event triggered a search for emergency core cooling systems or for a reactor design that would never encounter a core melt down under any condition of equipment failure, control failure, or human error. The resulting effort produced many designs that involve valves, pumps, and controls but since these require unfailing electrical power the designs have not been fully satisfactory. It is believed that there are only two designs which have any real likelihood of success. One is the liquid metal cooled reactor at Idaho Falls owned by the U.S. Government. This system is dependent on the liquid sodium metal always being present in the core under all accident or failure conditions. Obviously, this cannot be guaranteed, since reactor and the surrounding back-up vessel having liquid sodium inside could both fail. Another danger of this system is that sodium reacts violently with water and this could happen if there were any leaks in the steam generator. Furthermore, there has developed a strong preference for water cooled reactors, and there is much resistance to changing to sodium.

The other design that appears to have the possibility of success is the pebble bed reactor now under development in Germany. This system uses helium as a coolant and graphite balls about 6 cm in diameter infused with fissile or breeder material. This design has many good features and may be accepted by utilities in due time. The main criticism of it is that it employs helium as a coolant which must be conducted through steam generators to make steam for use in a turbine, or the helium can be conducted directly into a gas turbine.

It is an object of the present invention to provide a novel system for utilizing a nuclear fission reaction to produce superheated vapor, e.g., steam, and will automatically reduce its energy output in case of a malfunction so as to eliminate the possibility of a melt down. It is still another object of this invention to provide a novel system employing pelletized fuel in a boiling liquid reactor which produces superheated vapor. Still other objects will become apparent from the more detailed description which follows.

BRIEF SUMMARY OF THE INVENTION

This invention relates to a system for producing a superheated vapor by employing a nuclear fission reaction in a reactor containing pelletized fuel, said reactor being a closed pressure vessel partially filled with a reaction medium including a coolant liquid and said pelletized fuel dispersed therein, two or more nuclear reaction control rods adjustably positioned in said medium, means for continuously introducing pellets of fuel into said reaction medium and means for continuously removing pellets of spent fuel from said reaction medium; means for introducing said coolant liquid into said reactor, and means for removing superheated vapor of said coolant liquid from said reaction medium.

In specific and preferred embodiments of the invention water is used as the coolant to prepare superheated steam; the reactor is housed in a heat conducting web structure to provide rapid heat disbursement; and the system is provided with a flooding capability automatically activated when the temperature is too high or the pressure is too low. The pelletized fuel is a substantially spherical particle having a graphite core, covered by a layer of fuel particles in a high melting latex in an outer shell of a high melting alloy.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 3 is a horizontal cross section taken at 3—3 of FIG. 1;

FIG. 4 is a cross section of the pelletized fuel employed in this invention; and FIG. 5 is a horizontal cross section of an alternative embodiment of the reactor of this invention.

DETAILED DESCRIPTION OF THE INVENTION

The features of this invention can best be understood by reference to the attached drawings.

Figure 1:
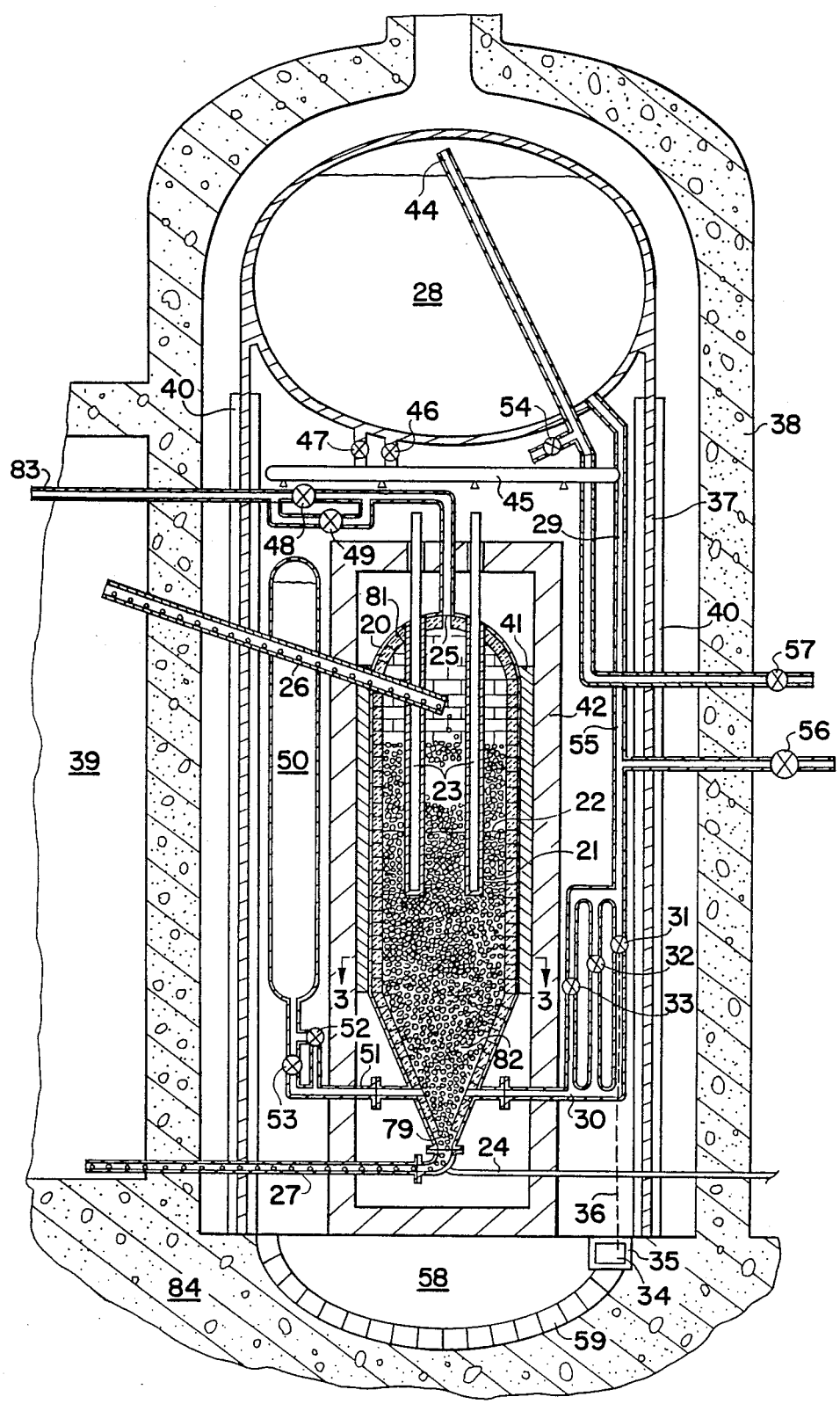
FIG. 1 is a vertical cross section of the reactor of this invention and its supporting system in a containment housing.

FIG. 1 shows the overall system of the invention. Reactor 20 is a generally cylindrical pressure vessel having a domed top 81 and a conical bottom 82. Inside reactor 20 is a mass of fuel pellets 21 submerged in a liquid having a level 22. Preferably, the liquid is water which is boiling and producing steam under pressure in dome 81. The superheated vapor (preferably steam) is drawn off through opening 25 into conduit 83 which conducts the steam to a power producer such as a turbine (not shown) The fuel particles 21 undergo a nuclear fission reaction to produce the heat necessary to convert the liquid 22 in reactor 20 to super-heated vapor. Fuel particles 21 are continuously removed through port 79 at the bottom of reactor 20 and conducted through conduit 27 for disposal or reprocessing. New fuel pellets 21 are continuously introduced into reactor 20 via conduit 26. Liquid (preferably water) is introduced into reactor 20 from conduit 24 into opening 79 to maintain the chosen level 22. The inside of reactor 20 is preferably lined with graphite blocks 60 to serve as a neutron reflector for the reactor core. In certain embodiments of this invention the reflector lining 60 may be modified to provide less reflection or omitted to provide no reflection of neutrons. This reflector for the reactor core. Control rods 23 are employed to control the nuclear reaction in the known way.

Reactor 20 is positioned inside a stand-alone containment housing 37 inside a suitable concrete building 38 resting on a large stable foundation 84 and having an open top 43. Containment housing 37 is a hollow vertical cylindrical shape with a large liquid reservoir 28 in the uppermost portions of the housing 37. Containment housing 37 in combination with foundation 84 completely encloses reactor 20. Preferably housing 37 is a steel, or other heat conducting metal, structure.

Around the outside of housing 37 is a heat dispersing web structure 40. This structure may take any of several forms, any of which will promote rapid heat transfer from the walls of reactor 20 to the surrounding environment by conduction, convection and/or radiation. A preferred structure is that shown in FIG. 2 wherein thin webs 64 radiate outwardly from reactor 20 to a circumferential ring or sheet 65 so as to define a plurality of vertical air spaces 85. Webs 64 and ring 65 are made of good heat conducting material, e.g., steel or aluminum. Air spaces 85 provide good areas for heat convection to occur. The purpose of this expanded heat conducting structure is to conduct heat away from reactor 20, particularly when the reactor core is overheating for any reason.

As a further safeguard, reactor 20 is enclosed by the same type of expanded web structure 41, all of which is enclosed in a closure of a high melting insulation 42, e.g. a material which melts at about 800° F.

The inside of containment housing 37 is provided with a capability for being flooded, as well as such a safeguard for reactor 20. The flooding of reactor 20 can occur through conduit 29 when one of valves 31, 32 and 33 is open leading to reactor 20 through conduit 30. The inside of housing 37 is protected by spray ring 45 which dispenses flooding liquid from reservoir 28 through either of valves 46 and 47. Reservoir 28 is filled by liquid entering through valve 56 and conduit 29. Since a vacuum could be formed when emptying reservoir 28, which might restrict the flooding action when it was desperately needed, vent line 44 leading to valve 57 is provided. A side line valve 54 is provided to break the vacuum if needed.

There are pairs of valves used in this system which automatically open depending on unusual operating conditions. One of the pairs operates on the presence of a high pressure and the other on the presence of a high temperature. These valves may be set to operate at a selected high pressure, e.g., 500 psi or a selected high temperature, e.g., 1000° F. Such pairs of valves are used in the conduits carrying flooding liquid and the conduit 83 carrying superheated vapor. Thus valves 32, 46, 48 and 52 are opened when a selected high pressure is exceeded, and valves 33, 47, 49 and 53 are opened when a selected high temperature is exceeded. Pressure valves 32, 46, 48 and 52 preferably are diaphragm operated valves. Temperature valves 33, 47, 49 and 53 are preferably bimetallic operated valves. In the instance of employing water for the coolant in the reactor, the flooding liquid in reservoir 28 may be borated water. There also may be one or more tanks 50 containing volumes of flooding liquid which can be released through a conduit 51 and valves 52 or 53 into the conical bottom 82 of reactor 20. Still another safeguard is that valve 31 is operated (opened) by the action of a float 34 in a tank 35 through some connecting means 36 to signal when to open valve 31. The action might be that of detecting the loss of coolant in reactor 20 by leakage, collecting eventually in the bottom of containment enclosure 37 causing float 34 to rise and valve 31 to open and flood the reactor core before it becomes too hot to operate.

Concrete building 38 is shown as having a full handling room 39 where spent fuel pellets are received via conduit 27 and new fuel pellets are sent to reactor 20 by way of conduit 26. It may be, of course, that some pellets from conduit 27 will contain unused fuel valves and should be returned to reactor 20 to use u the remaining fuel. The manner in which spent fuel pellets are inspected and handled, and the way in which fuel pellets are introduced into conduit 26 are not shown, and are considered to be within the skill of a nuclear power plant engineer.

The preferred fuel pellet is shown in FIG. 4 to be a generally spherical ball having a spherical core 66 of porous graphite for use as a moderator. Around core 66 is a spherical layer 67 of fuel particles 68 in a high melting matrix 69. For example, particles 68 may be nuclear fissionable materials in a graphite particle. Matrix 69 may be alumina or other inert material having a high melting point, e.g., above about 3500° F. Around layer 67 is a thin shell coating of a high melting alloy, e.g., molybdenum and chromium, melting above about 4000° F. Many other combinations of refractories and high melting point low neutron absorption materials may be employed as is known in the art. In certain embodiments of this invention such as the use of this invention as a breeder reactor, the fuel pellet may be made with less or no graphite in core 66 or in particles 68. This will be explained more fully below.

In FIG. 5 there is shown a lateral cross section, looking downwardly, of an alternate embodiment of the reactor 20 of this invention. In FIG. 5 the reactor is tubular in shape instead of the rod shape of FIGS. 1–2. The reactor of FIG. 5 has an outer cylindrical wall 71 and a concentric inner cylindrical wall 72 defining a tubular space 77 between those walls 71 and 72. Circular slot 80 is the bottom outlet of reactor space 77 through which spent fuel pellets are collected and conveyed to the fuel handling tower 39 for inspection and disposal or recycling. Inlet liquid to the reactor would enter through slot 80. An expanded heat conducting web structure 74 is attached to the outside of outside wall 71 of the reactor and a similar structure 73 is attached to the inside of inside wall 72. These structures 73 and 74 are similar to those described above with respect to FIGS. 1–3. A layer of insulation 76 overlays the outside of structure 74 and another layer of insulation 75 overlays the inside of structure 73. The top of space 77 is closed by a semi-toroidal dome (not shown) from which superheated vapor can be collected for use in driving a turbine.

Figure 2:
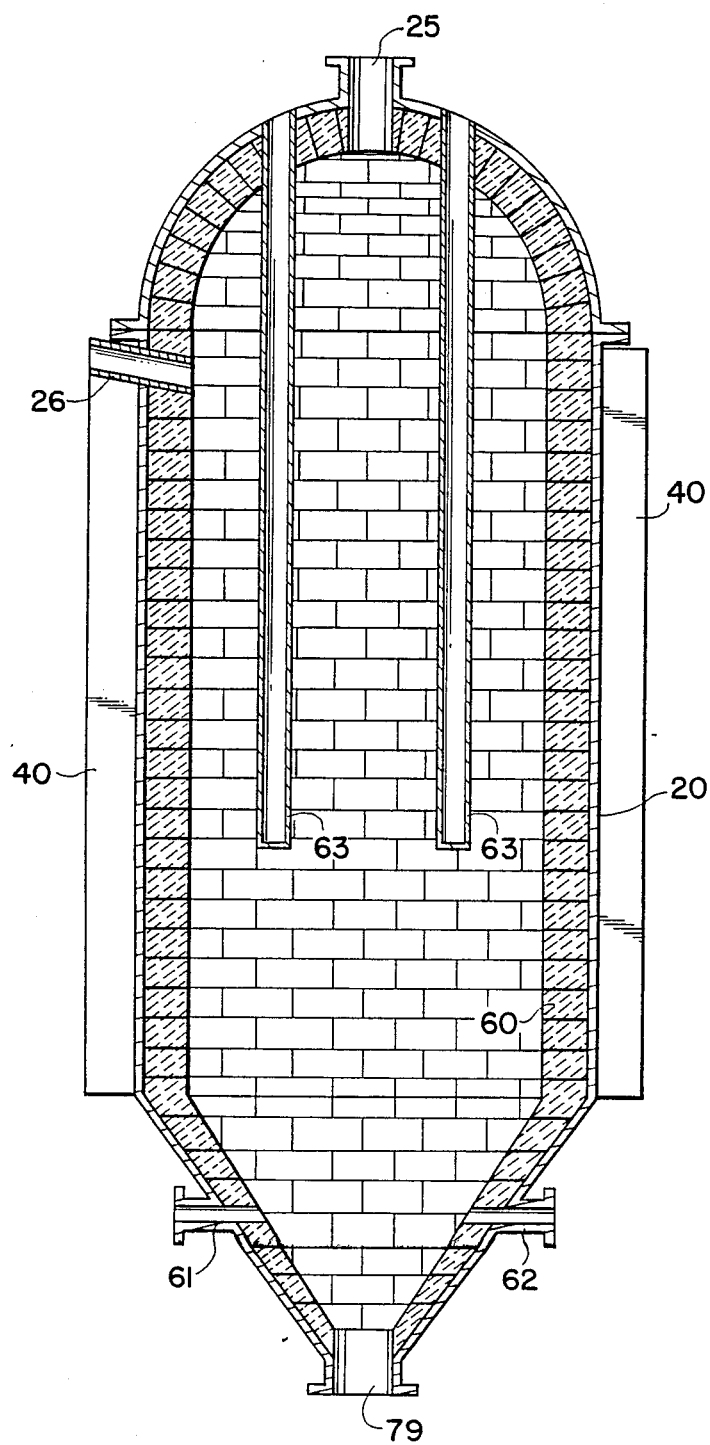
FIG. 2 is a vertical cross section of the reactor of the system of this invention.

Still other shapes of reactors can be imagined for this system, although the two described above are the preferred types, with the most preferred being the simple cylindrical design of FIGS. 1–3.

One of the advantages of the present invention is that it operates with a higher efficiency because of the higher temperature of the superheated steam produced in the reactor. All water cooled reactors operate on the Carnot cycle where the efficiency of the cycle is given by the equation $$E = (1 - K)\left[\frac{T_1 - T_2}{T_1}\right]$$

where $T_1$ is the steam temperature into the turbine (or the temperature leaving the reactor) which typically is 550° F. (1010° Abs.); $T_2$ is the steam temperature leaving the turbine, typically 100° F. (560° Abs.); and K=losses in the cycle, typically 0.25. Thus a boiling water reactor of the prior art $$E = (1 - 0.25)\frac{1010 - 560}{1010} = 0.34 \text{ or } 34\%.$$

If steam from reactor to turbine is 800° F. (typical in this invention) $T_1=800°$ F. (1260° Abs.) and, $T_2=560°$ Abs.

$$E = (1 - 0.25)\frac{1260 - 560}{1260} = 0.42 \text{ or } 42\%,$$

for an 8% improvement. Typical fuel cost per reactor year of operation in a plant producing one million kilowatts per hour is 60 million dollars. A savings of 8%=4.8 million dollars per year, or 192 million dollars over a 40 year lifetime.

A second advantage of this invention is that it eliminates most, if not all, of the down time for refueling of the prior art boiling water reactor.

Current water cooled reactors must be taken off the line about two months per year for refueling.

One million kilowatts per hour produces power having a sale value of about 6 cents per kilowatt, or $60,000 per hour. Two months time (1440 hours) is equivalent to $86,400,000 per year, or $3.456 billion over a 40 year lifetime. Much of this can be saved by the present invention which provides continuous refueling ability.

A third advantage of this invention is its improved safety. At any one time the present invention will only have sufficient uranium in the entire core to be a critical mass, while in contrast the prior art water cooled reactors have 150 fuel assemblies, of which only 4 are necessary to make a critical mass. Thus any possible destruction of the core would release considerably less contaminating material than any prior art reactor.

A fourth, and a very important advantage of this invention is that it can be operated as a breeder reactor. In a breeder reactor each fissioning atom makes one or more fissile atoms from the U-238 or Th 232 by absorbing a neutron and becoming Pu-239 and U-233, respectively.

In prior art water cooled reactors this happens about 0.55 times. This is a characteristic of the reactor due to the larger amount of water present in the core acting as a moderator slowing down the neutrons.

In the present invention the lower ⅓ of the reactor core is filled with liquid water; the center ⅓ is filled with a mixture of liquid and vapor and the top ⅓ is entirely filled with water vapor. Thus the opportunity for breeding with top ⅔ of the reactor is enhanced. The fuel would be as shown in FIG. 4 but instead of employing graphite in the core 66 and/or particles 68 which is a moderator that interferes with breeding, a nonmoderatory material would be used.

There are three main types of reactors which are generally classified according to the average energy of the neutrons in the core. Upon fission of an atom the neutrons expelled have an average energy of 2 Mev. These are fast neutrons and in general travel through or past most nuclei without fissioning, and are absorbed in new fissile materials such as U-238 and Th 232.

The three types are:

(1) Thermal-energy reactors—prior art water cooled reactors (both PWR and BWR) where neutrons born at 2 Mev are reduced to slightly over 0.025 ev by the moderator (water). These reactors do make about 0.55 atoms of fissile material from the fertile material in the core.

Intermediate-energy reactors—a reactor with neutron energy in range of 2-10 Mev. No present power reactors are operating in this range.

Fast-energy neutrons—the neutron energy is from 10 Kev up to maximum energy of born neutrons. Several power reactors are today operating in the range. To be in the range there must be little or no moderator in the core. The coolant may be gas (He, $CO_2$, $H_2$) or liquid metals such as Na or NaK.

The present invention has the unique feature that it can be made to operate as a thermal energy reactor with a conversion ratio of about 0.55. This will require fuel in a graphite matrix as shown and described for FIG. 4, and a graphite reflector 60 as shown in FIG. 2.

This invention can also be designed to operate as an intermediate—energy reactor by removing most of the graphite from the fuel of FIG. 4 and in its place using U-238 or Th 232. The top ⅔ of the core is gas cooled, thus having very little moderator (water) making it possible to function as an intermediate energy reactor. In such a case the conversion ratio would increase approximately to 1.0, which, of course would effect a considerable saving in fuel costs.

This invention can also be operated as a fast breeder reactor. The top ⅔ of the core would then be gas cooled with no moderator in the fuel (FIG. 4) and no moderator in the matrix. This would increase the conversion ratio to above 1.0 and then it would be classified as a breeder reactor since it makes more fissile material from the fertile material than it consumes. This would greatly reduce the fuel cost savings perhaps approaching 40 million dollars per year or 1.6 billion dollars over a 40 year lifetime, and it would help to insure that the available uranium supplies would literally last for thousands of years.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A system for producing a superheated vapor by employing a nuclear fission reaction in a reactor containing pelletized fuel, said reactor being a closed pressure vessel partially filled with a reaction medium including a coolant liquid and said pelletized fuel dispersed therein, two or more nuclear reaction control rods adjustably positioned in said medium, means for continuously introducing pellets of fuel into said reaction medium and means for continuously removing pellets of spent fuel from said reaction medium; means for introducing said coolant liquid into said reactor, and means for removing superheated vapor of said coolant liquid from said reaction medium; said pellets of fuel comprising substantially spherical pellets containing a core of porous graphite encased in a high melting point matrix having dispersed therein tiny pellets of a mixture of graphite and nuclear fissionable material, and a substantially spherical coating over said matrix of a metallic alloy having a melting point above about 4000° F.

2. The system of claim 1 wherein said matrix is alumina melting at about 3700° F.

3. The system of claim 1 wherein said alloy is a mixture of molybdenum and chromium having a melting point of about 4500° F.

4. A system for producing a superheated vapor by employing a nuclear fission reaction in a reactor containing pelletized fuel, said reactor being a closed pressure vessel partially filled with a reaction medium including a coolant liquid and said pelletized fuel dispersed therein, two or more nuclear reaction control rods adjustably positioned in said medium, means for continuously introducing pellets of fuel into said reaction medium and means for continuously removing pellets of spent fuel from said reaction medium; means for introducing said coolant liquid into said reactor, and means for removing superheated vapor of said coolant liquid from said reaction medium; said reactor being a cylindrical tubular vessel with closed dome top and a conical bottom and a central space for containing said pelletized fuel disposed in water; an outlet in said dome top, an outlet in said conical bottom, a plurality of vertical tubular receptacles for receiving control rods therein; a jacket around the outside of said reactor between said domed top and said conical bottom, said jacket comprising a webbed structure of radial webs and circumferential rings of heat conducting material defining vertical air channels to enhance heat removal by convection and a layer of high melting insulation around the outside of said webbed structure; said cylindrical tubular structure having concentric inside and outside walls defining an intermediate tubular space for said fuel and water, closed at the top by a dome and closed at the bottom by a tapering conical structure, said webbed structure being attached to the outside of said outside wall and to the inside of said inside wall; and said layer of insulation being attached to each of said webbed structures, leaving a central cylindrical open space extending the vertical length of said reactor.

* * * * *